(12) United States Patent
Sadiq et al.

(10) Patent No.: US 7,853,280 B2
(45) Date of Patent: Dec. 14, 2010

(54) METHOD AND APPARATUS FOR ARBITRATING ONE OR MORE MEDIA STREAMS WITHIN A SINGLE POC SESSION

(75) Inventors: Rummana S. Sadiq, Glendale Heights, IL (US); Anatoly Agulnik, Deerfield, IL (US); Trent J. Miller, West Chicago, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 722 days.

(21) Appl. No.: 11/759,409

(22) Filed: Jun. 7, 2007

(65) Prior Publication Data

US 2008/0305820 A1   Dec. 11, 2008

(51) Int. Cl.
*H04B 7/00* (2006.01)

(52) U.S. Cl. .................. 455/518; 455/519; 455/90.2; 455/3.06

(58) Field of Classification Search .......... 455/518, 455/519, 90.2, 41.2, 556.2, 413, 420, 425, 455/428, 439, 442, 456.2, 464, 177.1; 370/270, 370/252, 473, 395.2
See application file for complete search history.

(56) References Cited

U.S. PATENT DOCUMENTS

| | | | |
|---|---|---|---|
| 2004/0224710 A1* | 11/2004 | Koskelainen et al. | 455/518 |
| 2005/0124365 A1* | 6/2005 | Balasuriya et al. | 455/518 |
| 2005/0227722 A1* | 10/2005 | Harris et al. | 455/518 |
| 2006/0035657 A1* | 2/2006 | Lim | 455/518 |
| 2006/0083244 A1* | 4/2006 | Jagadesan et al. | 370/395.2 |
| 2006/0121924 A1* | 6/2006 | Rengaraju et al. | 455/518 |
| 2007/0104121 A1 | 5/2007 | Shaffer et al. | |
| 2008/0037448 A1* | 2/2008 | Kelley et al. | 370/270 |
| 2008/0232269 A1* | 9/2008 | Tatman et al. | 370/252 |

FOREIGN PATENT DOCUMENTS

| | | |
|---|---|---|
| EP | 1729475 A1 | 5/2005 |
| EP | 1672866 A1 | 6/2006 |
| EP | 1804455 A1 | 7/2007 |
| WO | 2005062569 A1 | 7/2005 |
| WO | 2006006897 A1 | 1/2006 |

(Continued)

OTHER PUBLICATIONS

Allen, Andrew: OMA-POC-POCv2-2005-0029-AD-MODERATED-POC-GGOUPS, Moderated PoC Groups Architecture, 2004 Open Mobile Alliance Ltd., pp. 1-10.

(Continued)

*Primary Examiner*—Tan Trinh

(57) ABSTRACT

A method of managing a Push-To-Talk over Cellular communication session includes establishing, with a first user equipment, a Session Initiation Protocol Push-To-Talk session that includes a Session Initiation Protocol Push-To-Talk server and at least one second user equipment. The method also includes designating, with the first user equipment, either the Session Initiation Protocol Push-To-Talk server or one of the at least one second user equipment, to act as an arbiter of a media stream. The method further includes transmitting, with the first user equipment, while engaged in the Session Initiation Protocol Push-To-Talk session, the media stream directly to at least one of the at least one second user equipment without receiving a transmit instruction from the Push-To-Talk server.

27 Claims, 6 Drawing Sheets

FOREIGN PATENT DOCUMENTS

WO 2007005570 A2 1/2007

OTHER PUBLICATIONS

Sedlacek, Ivo: OMA-POC-POCv2-2006-XXXX-PoCBoxinSessionInfo9-ch-.doc, Change Request, Multiple Continuous Media synchronization, OMA-TS-PoC-System-Description-V2_0_0-20060414-D.zip, May 8, 2006, 2005 Open Mobile Alliance Ltd., pp. 1-2.

Zhang, Aegean et al.: OMA-POC-POCv2-2006-0535-UP-Media-Burst-Request-for-Other-PoC-User Change Request, UP-Media-Burst-Request-for-Other-PoC-User, OMA-TS-PoC-UserPlane-V2_0-20060522-D.doc, Jun. 3, 2006, 2006 Open Mobile Alliance Ltd, pp. 1-4.

* cited by examiner

METHOD AND APPARATUS FOR ARBITRATING ONE OR MORE MEDIA STREAMS WITHIN A SINGLE POC SESSION

FIELD OF THE INVENTION

The present invention generally relates to the field of wireless multimedia communications, and more particularly relates to independently arbitrated multimedia content transmission within a multi-user communication session.

BACKGROUND OF THE INVENTION

In a Push to Talk (PTT) communication session, a user with a communications device pushes a "Talk" button to transmit voice or other media to one or more other devices participating in the PTT communications session. Each user is able to initiate a transmission if no other communications device is transmitting/speaking, thereby supporting a communications session involving multiple users where each user is able to participate. Cellular telephone systems are incorporating functionality to perform PTT over Cellular (PoC) communication sessions, whereby a user is able to operate a cellular phone in a manner that appears to the user to be a conventional PTT communications session.

PoC communication sessions are sometimes managed by transmission of Session Description Protocol (SDP) and Session Initiation Protocol (SIP) messages between a PoC controller, in conjunction with a Radio Access Network (RAN), and multiple Mobile Subscriber (MS) units.

A standard known as OMA PoC 1.0 (http://www.openmobilealliance.org) focuses primarily on voice services for 1-to-1, group, and chat room call types. As broadband technologies become more prevalent, these simple call types will evolve. Users will desire to share multiple media streams (e.g., voice, music, and video) within the confines of a single PoC session. However, whenever multiple media streams are present, the issue of floor control arises.

In PoC 1.0, floor control for voice is carried out by the Talkburst Control Protocol (TBCP), which is used by the PoC server. The PoC server is a central arbiter and the floor is granted to a single client at a time. Because the voice stream is arbitrated only by the controlling PoC server, the system suffers from the disadvantage that originating clients cannot select how each stream is arbitrated.

Situations can arise where a client may wish to designate one stream in the session to be arbitrated by the controlling PoC server and another stream arbitrated by one of the clients in the session. For instance, a PoC user participating in a group call, in addition to hearing the audio of the current talker, may wish to select the video feed of another group member (who may not be the current talker). Unfortunately, current PoC server arbitration management methods do not support multiple media streams in a single session with independent floor arbitration control for each media stream.

In some communication sessions, certain content is essential for the purpose of the session. For instance, if a session is for discussing a particular piece of video, it is useless to include a user with a device that is not capable of displaying the video. In other cases, content is an enhancement to the conversation, but not necessary. With current PoC systems, originating clients cannot designate which of multiple media streams in the session are mandatory (i.e., all participants must receive) or optional (terminating clients may select the streams they wish to receive).

Additionally, there is no currently existing method for a user in a session to electronically request another user in the same session to initiate a subsequent media stream to the current session (e.g., user 1 requests user 2 to begin transmitting video).

Therefore a need exists to overcome the problems with the prior art as discussed above.

SUMMARY OF THE INVENTION

Briefly, in accordance with one aspect of the present invention a method of managing a Push-To-Talk over Cellular communication session includes establishing, with a first user equipment, a Session Initiation Protocol Push-To-Talk session that includes a Session Initiation Protocol Push-To-Talk server and at least one second user equipment. The method also includes designating, with the first user equipment, either the Session Initiation Protocol Push-To-Talk server or one of the at least one second user equipment to act as an arbiter of a media stream. The method further includes transmitting, with the first user equipment, while engaged in the Session Initiation Protocol Push-To-Talk session, the media stream directly to at least one of the at least one second user equipment without receiving a transmit instruction from the Push-To-Talk server.

In accordance with another feature of the present invention, the transmitting is in response to a floor grant from at least one of the at least one second user equipment.

In accordance with yet another feature, the present invention includes receiving, by the first user equipment, while engaged in the Session Initiation Protocol Push-To-Talk session, the media stream directly from at least one of the at least one second user equipment.

In accordance with a further feature, the present invention includes designating the media stream as mandatory and sending an instruction to remove from the session all of the second user equipment that do not have media playback ability.

In accordance with still another feature, the present invention includes designating the media stream as optional.

In accordance with still another feature, the present invention includes requesting from one of the at least one second user equipment transmission of a media stream.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as illustrative examples for the claims and as a representative basis for teaching one skilled in the art to variously employ the present invention in virtually any appropriately detailed structure. Further, the terms and phrases used herein are not intended to be limiting; but rather, to provide an understandable description of embodiments of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The present invention, according to an embodiment, overcomes problems with the prior art by providing a system and method that provides multiple independently arbitrated media streams within a single PoC session.

User equipment incorporating an embodiment of the present invention are able to exchange multiple media streams in a single SIP session, with the source of each media stream having the ability of being independent from the other sources. In addition, each stream may have a different arbiter, with the initiating PoC client requesting the arbiter for each media stream in the PoC session.

Figure 1:
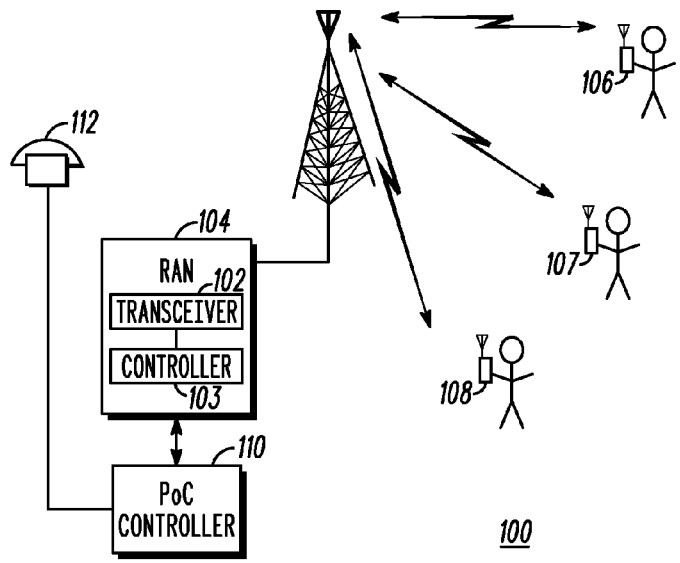
FIG. 1 is a system diagram for a multi-party wireless communication system according to an embodiment of the present invention.

FIG. 1 is a system diagram of an exemplary multi-party wireless communication system 100 according to an embodiment of the present invention. The multi-party wireless communications system 100 supports, for example, Push-To-Talk (PTT) over Cellular (PoC) communications between and/or among two or more instances of users equipment (UEs), such as mobile stations (MSs) 106-108, for example, a cellular telephone, a radio telephone, a smart phone, or a wireless-enabled personal computer, laptop computer, or personal digital assistant (PDA). MSs 106-108 of the exemplary embodiment are in wireless communication with a radio access network (RAN) 104. The invention, however is not limited to wireless user communication devices and a user equipment (UE) as referred to herein, can include any other user communication device, such as a wired communication device 112, for example, an Ethernet connected UE such as a personal computer or a laptop computer.

RAN 104 includes a transceiver 102, such as a base transceiver station (BTS) or a Node B, coupled to a controller 103, such as a base station controller (BSC) or a radio network controller (RNC). RAN 104 provides Radio Frequency (RF) services to MSs 106-108 residing in a coverage area of the RAN. The exemplary embodiments of the present invention utilize cellular radio communications techniques to support communications between MSs 106-108 and RAN 104. Communications sessions including an MS, such as one of MSs 106-108, are able to include PoC communications with other MSs 106-108 or other suitably equipped users equipment in connection with the RAN 104, through either wireless or wired communications links.

PoC communications are controlled in the exemplary embodiment by a PoC controller 110 that is in communication with the RAN 104. Although depicted in FIG. 1 as a single element, in various embodiments of the present invention PoC controller 110 may comprise multiple processors that are distributed across a cellular communications infrastructure to provide efficient processing of PoC communications sessions across a cellular telephone network. The PoC controller 110 is also connected to, for example, wired communications devices 112 through a suitable wired interface. Together, RAN 104 and PoC controller 110 are collectively referred to herein as a network of communication system 100.

The PoC controller 110 establishes and maintains PoC sessions with UEs through data messages that conform to modifications of messages defined by the Session Description Protocol (SDP), Session Initiation Protocol (SIP), and Talk Burst Control Protocol (TBCP). The SDP is defined by RFC 2327 and the SIP is defined by RFC 3261, both produced by the Internet Engineering Task Force, and the TBCP is defined within the OMA-TS_PoC-UserPlane-V1_0-20060127-C, produced by the Open Mobile Alliance. The content and teachings of all of these protocol definitions is hereby incorporated herein by reference and the modifications to these protocol standards are described below. The exemplary embodiments of the present invention utilize these modified protocols to more efficiently manage PoC communications sessions.

The exemplary multi-party wireless communication system 100 supports communications among UEs, for example, between an MS, such as MS 106, and other MSs 107, 108 or wired communications device 112, through the processing provided by the RAN 104, the PoC controller 110, and other controllers (not shown) that are associated with the multi-party wireless communication system 100, as would be understood by ordinary practitioners in the relevant arts in light of the present discussion. Further embodiments of the present invention are able to use any suitable wired or wireless communications link to connect the MSs 106-108 to the PoC controller 110, such as Bluetooth® links, infrared links, or any suitable digital or analog link. Once a communication link is set up between any two or more of the UEs, the PoC controller 110 carries out floor control by using the Talkburst Control Protocol (TBCP). In this mode, the PoC server 110 can serve as a central arbiter for voice communication. However, in other embodiments of the present invention, as will be explained in detail below, any of the UEs, such as MSs 106-108 or wired communication device 112, are able to serve as arbiters of any of a plurality of available media streams that may be communicated during any single session.

An arbiter of a media stream, such as a voice communication, in communication system 100 controls a grant of a floor with respect to such a media stream, for example, by conveying a floor grant, that is, an instruction to transmit, to a party that the arbiter determines has the floor, and further may determine which participants in a PoC communication session may or may not receive the media stream. The arbiter may grant a floor in response to receiving a media stream (for example, granting the floor to itself), or the arbiter may grant a floor to a UE in response to receiving a request to transmit from the UE. In various embodiments of the present invention, the transmit request may identify the media for which a grant is requested or the media sought to be transmitted may be evident to the arbiter, for example, when PoC controller 110 or a UE is an arbiter for only one of the multiple media streams. When a UE receives a floor grant, the UE may then transmit the associated media stream.

Figure 2:
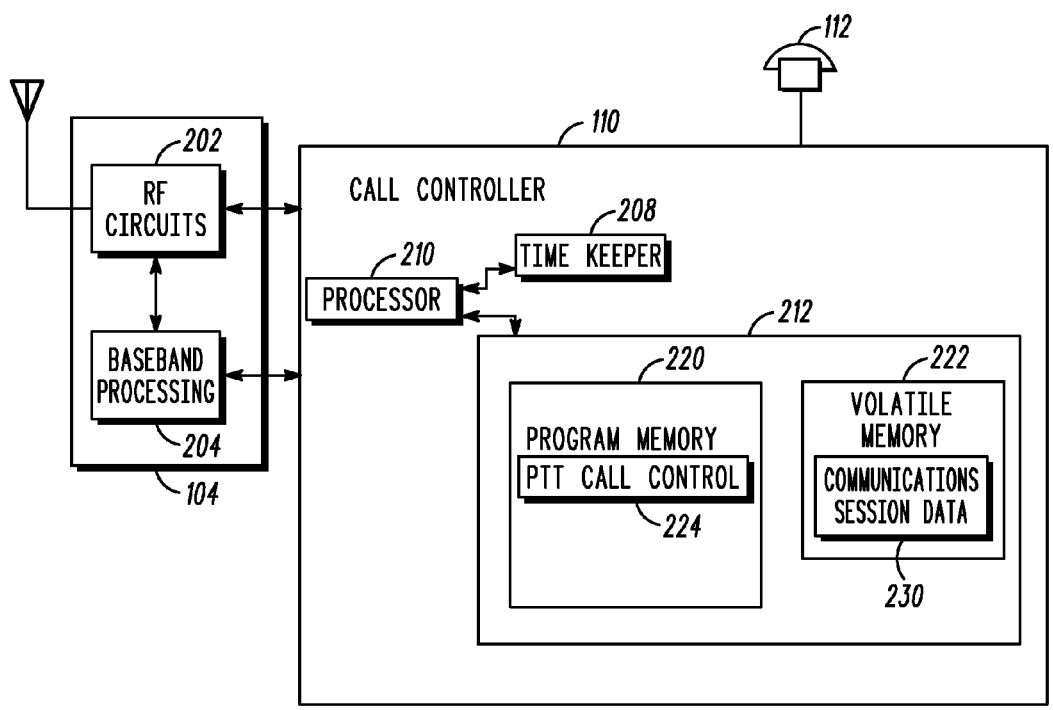
FIG. 2 is a Push-To-Talk over Cellular (PoC) infrastructure system block diagram according to an embodiment of the present invention.

FIG. 2 is a PoC infrastructure system block diagram 200 according to an embodiment of the present invention. The exemplary PoC infrastructure system block diagram 200 shows details of the RAN 104 and the PoC controller 110. The RAN 104 includes RF circuits 202 and baseband processing 204 to implement cellular radio communications between an MS, such as MS 106, and one or more other MSs 107, 108 and/or other communications devices, such as wired communications device 112. RF circuits 202 reside in transceiver 102 and baseband processing 204 may reside in transceiver 102 or controller 103 or may be distributed among the transceiver and the controller.

The PoC controller 110 includes a time keeper 208 that tracks various time periods defined by the communications protocols implemented by the PoC controller 110, and triggers processing after expiration of those specified time periods. The PoC controller 110 further includes a processor 210, such as one or more microprocessors, microcontrollers, digital signal processors (DSPs), combinations thereof or such other devices known to those having ordinary skill in the art, that executes programs and provides control to various devices within and associated with the PoC controller 110. The processor 210 creates and dispatches messages defined by the various protocols implemented by the PoC controller 110 for transmission by the RAN 104 to the MSs 106-108. The processor 210 also processes protocol messages received from the MSs 106-108 through the RAN 104. For example, the processor 210 generates and processes received SDP, SIP and TBCP messages. The PoC Controller 110 further includes a memory 212 that stores data and programs that are accessed and manipulated by the processor 210.

The operation of the processor 210, and the PoC controller 110 in general, is controlled by computer programs stored in a program memory 220 within memory 212. The program memory 220 of the exemplary embodiment includes a PTT call control program 224. The PTT call control program 224 implements the protocol processing for the SDP, SIP, TBCP, and other protocols implemented and controlled by the PoC controller 110.

The memory 212 further includes a volatile memory 222. The volatile memory 222 of the exemplary embodiment stores information being processed by the processor 210. For example, the volatile memory 222 stores communications session data 230, which contains data specifying PoC communications sessions being controlled by the PoC controller 110.

Figure 3:
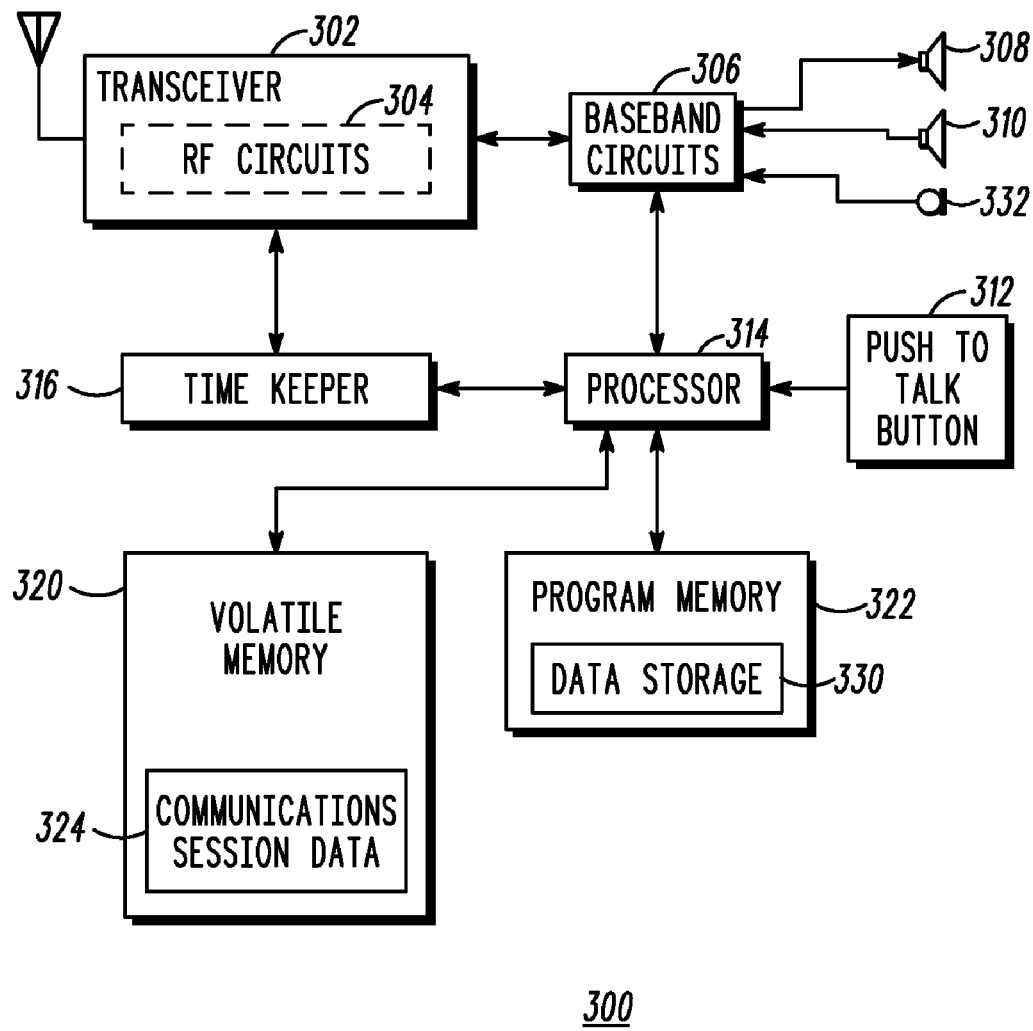
FIG. 3 is a mobile subscriber unit block diagram according to an embodiment of the present invention.

FIG. 3 is a block diagram of a UE 300, such as MSs 106-108 and wired communication device 112, according to an embodiment of the present invention. The UE 300 includes a transceiver 302 for interfacing with the communications system 100 network and other UEs and for receiving communications from, and conveying communications to, another UE directly or via the network. In the event that the UE 300 is a wireless communication device, such as MSs 106-108, transceiver 302 may include RF circuits 304 that are used to perform radio communications with, for example, the RAN 104, and in particular transceiver 102, via an antenna. The UE 300 further includes baseband circuits 306 that process baseband data, such as voice signals or user data, which are received or transmitted by the transceiver 304. The UE 300 further includes a microphone 310 and a speaker 308 to support voice communications. Baseband circuits 306 of the exemplary embodiment are further able to receive and decode protocol data messages and user data, which are exchanged with a processor 314 described below.

The operation of the UE 300 is controlled by a processor 314, such as one or more microprocessors, microcontrollers, digital signal processors (DSPs), combinations thereof or such other devices known to those having ordinary skill in the art. The processor 314 executes computer programs stored in a main memory 322 and a volatile memory 320 that are coupled to, or included in, the processor 314 and manipulates and accesses data stored in the main memory and the volatile memory. The main memory 322 includes programs that make up a communications sessions controller, including a communications session processing program, a communications session messaging control program, and a communications session maintenance processing program. In addition, the main memory 322 has a data storage area 330 for storing data such as video, audio, pictures, graphics and others. Data stored and manipulated in the volatile memory includes, for example, communications session data 324, which defines data concerning established communications sessions to which the UE 300 is assigned.

The processor 314 controls the operation of the UE 300 while operating in a PoC communications session. While in a PoC communications session, UE 300 generally receives voice and/or data transmissions that originate from other users and originates voice and/or data transmissions. A user of the UE 300 is able to transmit signals, such as voice signals picked up by microphone 310, by pressing a PTT button 312 in communication with the processor. Pressing the PTT button 312 is detected by the processor 314, and protocol messages to configure the PoC communications session to allow the UE to transmit are exchanged through the baseband circuits 306 and RF circuits 304 of the MS. A user of the UE 300 is also able to capture video via a camera 332 coupled to the base band circuits 306. Video captured by the camera 332 can be transmitted to other UEs, such as MSs 106. In addition, video captured by the camera 332 can be stored in main memory 322 and recalled at a later time for transmission. Sound captured by microphone 310 can also be stored in main memory 322 and recalled at a later time for transmission to other UEs.

The embodiments of the present invention preferably are implemented within the PoC controller 110 and the UE 300, and more particularly with or in software programs and instructions stored in the respective memories 212, 320, 322, of the PoC controller and the UE and executed by the respective processors of the PoC controller and the UE. However, one of ordinary skill in the art realizes that the embodiments of the present invention alternatively may be implemented in hardware, for example, integrated circuits (ICs), application specific integrated circuits (ASICs), and the like, such as ASICs implemented in one or more of the of the PoC controller and the UE. Based on the present disclosure, one skilled in the art will be readily capable of producing and implementing such software and/or hardware without undo experimentation.

Figure 4:
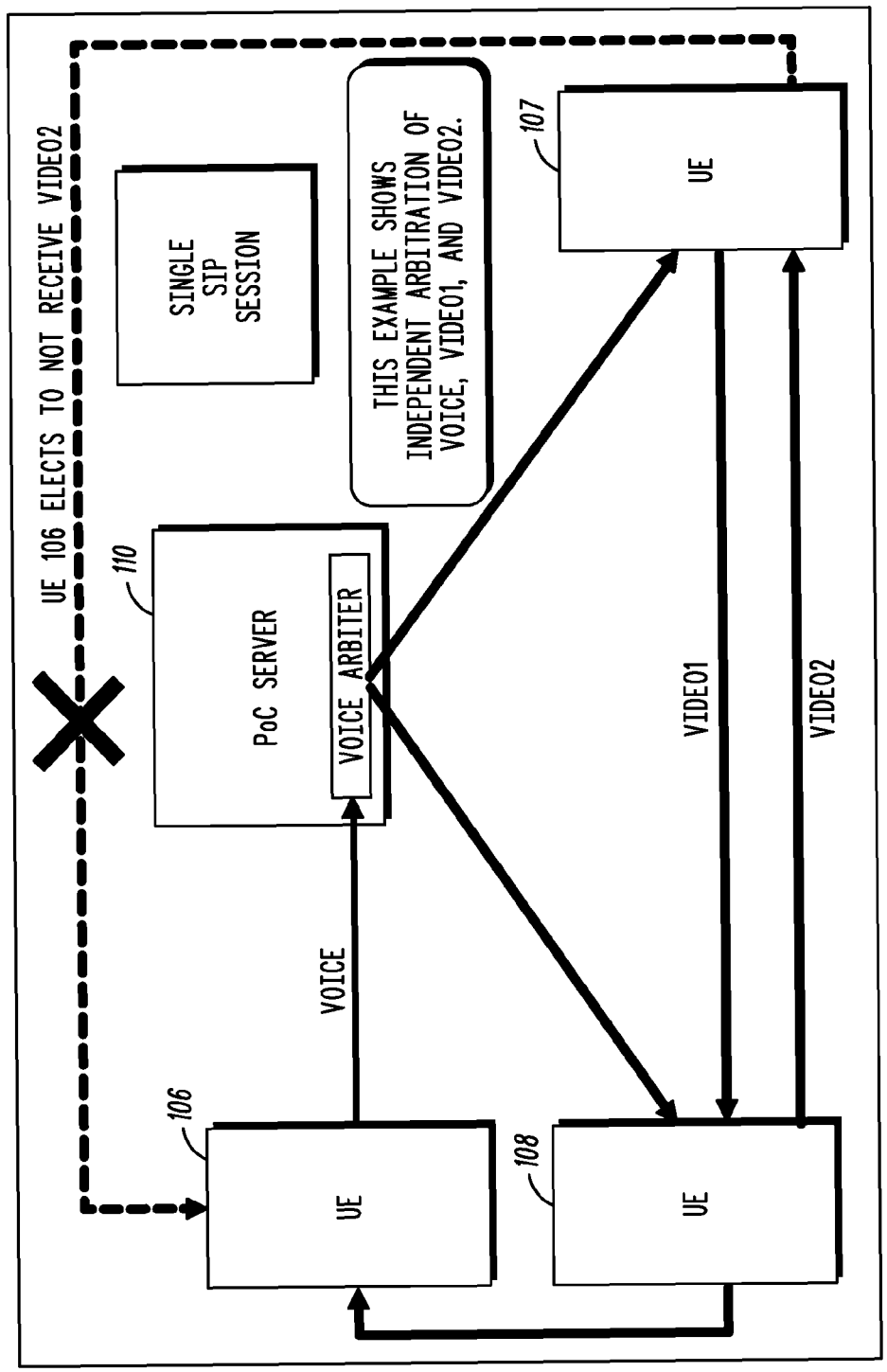
FIG. 4 is a block system diagram of a Push-To-Talk (PTT) communications session where a Push-To-Talk over Cellular (PoC) server is in communication with multiple users equipment according to an embodiment of the present invention.

FIG. 4 is a block diagram illustrating a SIP PTT communication session involving a PoC server, for example, PoC server 110, and multiple participants, or UEs, for example, MSs 106-108, according to various embodiments of the present invention. In the embodiments depicted in FIG. 4, the PoC server 110 retains control (arbitration), that is, serves as arbiter, of the voice communication function of the SIP PTT communication session. The arbiter determines which voice or data is transmitted to whom and at what time. The PoC server may be designated as the arbiter by a UE, such as MS 106, that originated the communication session or may retain control of the voice communication function by default. As is shown in FIG. 4, the PoC server 110, serving as the voice arbiter for the session, receives voice data from a first UE of the multiple UEs, for example, MS 106, and retransmits it to other UEs of the multiple UEs, for example, to a second UE of the multiple UEs, for example, MS 107, and a third UE of the multiple UEs, for example, MS 108.

In one embodiment of the present invention, when a user, such as a user of MS 106, initiates a video-enabled SIP PTT communication session, instead of simply transmitting the current talker's video to every participant, the initiating user could be provided with a choice. In such an embodiment, the PoC server 110 allows a sharing amongst the UEs participating in the communication session, such as MSs 106-108, of arbitration of particular aspects of the communication session and of participation in the communication session. That is, while the PoC server 110 retains control of the voice communication function of the communication session, the PoC server may allow multiple media streams to be exchanged in the session wherein the source for each media stream may be independent (e.g., video may be originated by a UE different from the originator of the session and/or different from the current talker) and the arbiter of each media stream may be different. For example, when the communication session includes multiple media streams, the originator of the session may designate an arbiter for each stream of the multiple streams or an originator or a sender of each stream may designate an arbiter for that stream. That is, an originator or sender (which sender may receive the media stream from another sender) of a first stream of the multiple media streams may designate an arbiter of the first stream and an originator or sender of a second stream of the multiple media streams may designate an arbiter of the second stream, which designated arbiters may be different from each other and/or may comprise one or more of the PoC server, the designating originator or sender, or a UE other than the designating originator or sender.

Figure 5:
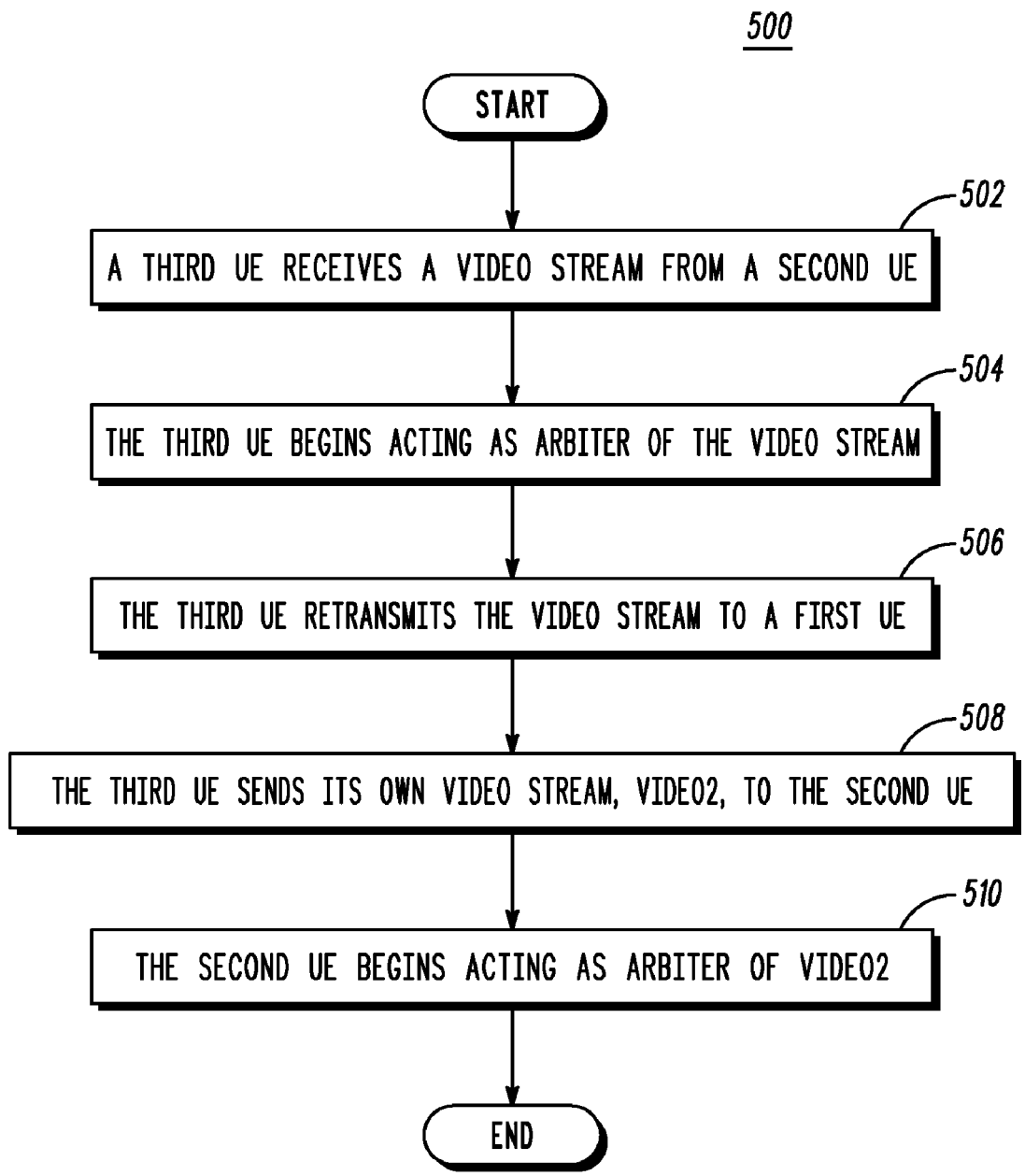
FIG. 5 is a Push-To-Talk (PTT) communications session processing flow diagram where a receiving user equipment acts as arbiter of a media file according to an embodiment of the present invention.

For example, FIG. 5 is a logic flow diagram 500 of a PTT communications session where a receiving UE acts as arbiter of a media file in accordance with an embodiment of the present invention. Referring now to FIGS. 4 and 5, a SIP PTT communication session is originated by a first UE, that is, MS 106. At step 502, a second UE, for example, MS 107, participating in the communication session originates a first video stream, video1, begins acting as an arbiter of the first video stream, and conveys the first video stream to a third UE, for example, MS 108, participating in the communication session without receiving a transmit instruction from the PoC server 110. At step 504, in response to receiving the first video stream, the third UE, that is, MS 108, may begin acting as an arbiter of the first video stream. At step 506, the third UE retransmits the first video stream to one or more other UEs, for example, to the first UE, that is, MS 106, without notifying, or receiving a transmit instruction from, the PoC server 110. The first UE then may begin acting as an arbiter of the first media stream. Similarly, at step 508, the third UE, that is, MS 108, originates a second video stream, video2, begins acting as an arbiter of the second video stream, and sends the second video stream to one or more other UEs, for example, to the second UE, that is, MS 107. At step 510, the second UE may begin acting as an arbiter of the second video stream, again without notifying, or receiving a transmit instruction from, the PoC server 110. Processing flow diagram 500 then ends.

In one embodiment of the present invention as illustrated in FIG. 5, each sender of a media stream is able to designate, either before, during, or after transmission, a particular arbiter for a video stream, or file (e.g., a push-to-show application). In turn, when acting as an arbiter of a media stream, the UE controls a grant of a floor with respect to such a media stream, for example, by conveying a floor grant, that is, an instruction to transmit, to a party that the arbiter determines has the floor, and further may determine which participants in a PoC communication session may or may not receive the media stream. The arbiter may grant a floor in response to receiving a media stream (for example, granting the floor to itself without receiving a designation from another arbiter, and then sending the stream without requesting permission to do so), or the arbiter may grant a floor to a UE in response to receiving a request to transmit from the UE. Furthermore, when acting as an arbiter of the media stream, a UE may replicate the media stream to produce multiple replicated copies of the media stream and then convey the multiple replicated copies to multiple other participants in the communication session.

For example, the user of the UE initiating the session can request, that is, designate, an independent arbiter for each stream in the session or can request all streams to have a single arbiter ("shared arbitration"). By way of another example, a participating UE may submit a request that a media stream be added to a communication session by itself or by another session participant after the session has begun (e.g., one user can request another user to add video to the current voice session) and concurrent with, or after, conveying the request, designate an arbiter of that stream, for example, itself or another recipient of that stream.

For example, a SIP PTT communication session typically is set up by an originator, such as one of MSs 106-108, conveying a session invention, such as a SIP INVITE, to a PoC server, such as PoC server 110. The session invitation identifies a group and/or target UEs that are invited to participate in the call. In response to receiving the session invitation, the PoC server then conveys session invitations, such as SIP INVITEs, to the target UEs. In an embodiment of the present invention, the originator and PoC server may convey session invitations that include data fields that identify an arbiter of a media flow, such as SIP INVITES that are modified to include such data fields, for example, by modifying SDP (Session Description Protocol) parameters. After arbiters are designated, a designated arbiter of a media flow may designate a new arbiter of the flow by indicating the new arbiter in a modified version of a SIP REINVITE or a modified version of a SIP UPDATE that is sent by the current arbiter to the other participants in the session, which messages are modified to include a data field identifying the new arbiter, again, for example, by modifying SDP parameters.

In another embodiment of the present invention, in response to conveying, to a designated arbiter, a request to transmit and receiving a floor grant in return, a participating UE may replicate the media stream to produce multiple replicated copies of the media stream and then convey the multiple replicated copies to multiple other participants in the communication session. For example, with respect to FIG. 5, any of the participating UEs, that is, MSs 106-108, instead of acting as an arbiter of a received video stream, may instead convey a request to transmit to an acting arbiter, such as the UE that conveyed the stream to the receiving UE. In response to receiving a floor grant, the UE may replicate the media stream to produce multiple replicated copies of the media stream and then convey the multiple replicated copies to other participants in the communication session.

In yet another embodiment of the present invention, users participating in a group call can be provided with a list of all participants whose video the user could view. A user could then select whichever participant he/she desires to receive video from and so inform the network, and the network could transmit the video of the selected participant to that user. The present invention provides complete flexibility; instead of just viewing the current talker, the users could pick whose video they can and wish to receive.

Most devices allow each individual user to disable/enable his/her video transmission and reception abilities. In one embodiment, a list of video-enabled participants, that is, those participants whose UE are video enabled, is made available to a transmitting user. The transmitting user can then take into account the enabled/disabled status of other users participating in the session before including a participant in the list of users who will participate in the video aspect of the session.

Figure 6:
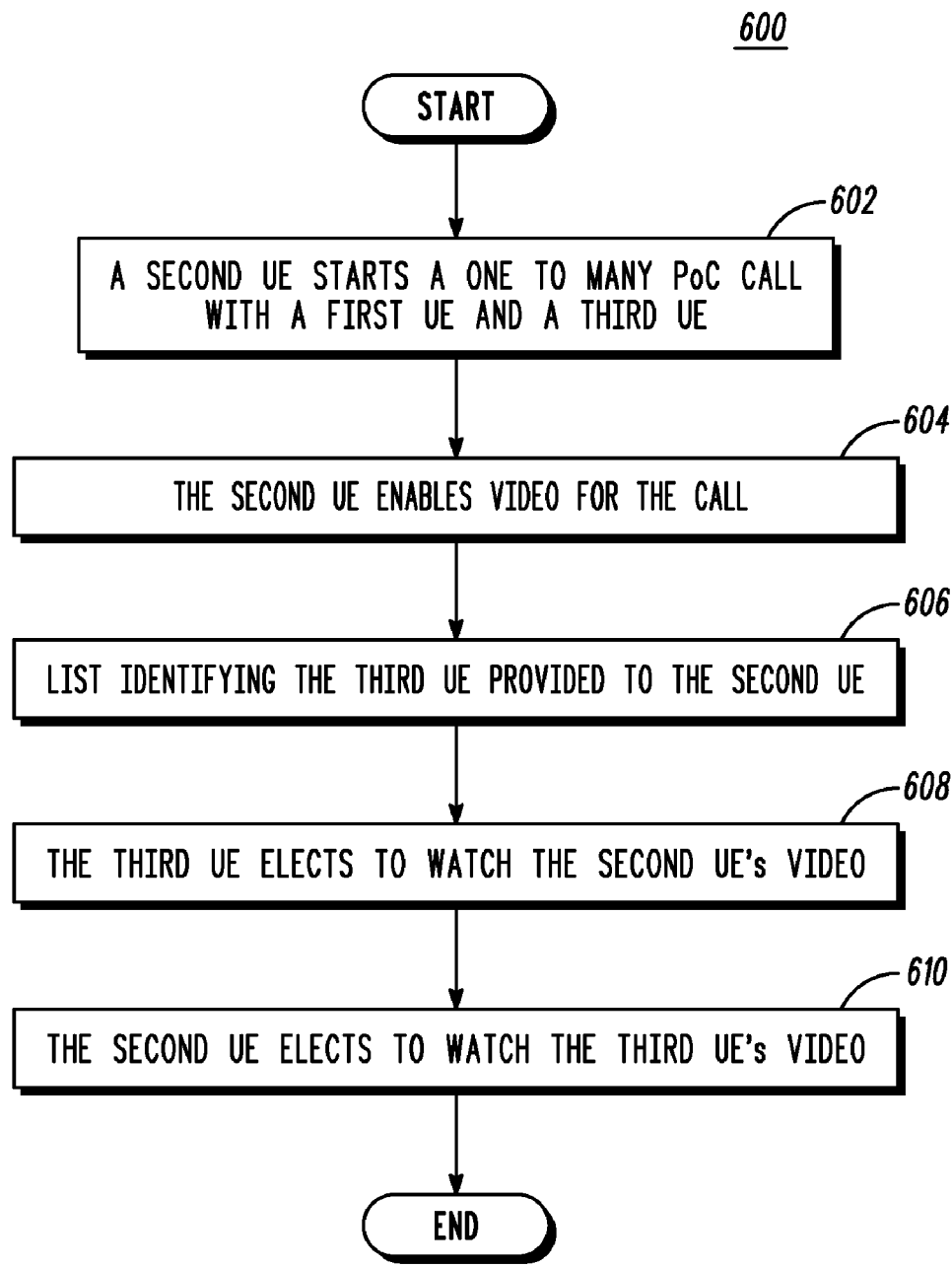
FIG. 6 is a Push-To-Talk (PTT) communications session processing flow diagram with a media file and at least one user equipment that is not capable of viewing video according to another embodiment of the present invention.

For example, FIG. 6 is a processing flow diagram 600 of a PTT communications session with a media file and at least one UE that is not capable of viewing video according to another embodiment of the present invention. Referring now to FIGS. 4 and 6, suppose, at step 602, the second UE, that is, MS 107, starts a one-to-many PoC call with the first and third UEs, that is, MSs 106 and 108. Now assume the user operating the first UE, that is, MS 106, has video transmission from his/her UE disabled and has so informed the network. At step 604, the second UE, that is, MS 107, as the originator of the session, is granted the floor to talk and enables video on his/her device for the call. At step 606, a list identifying the third UE, that is, MS 108, is provided to the second UE by the network. The first UE, that is, MS 106, is not included in the list since the first UE disabled video transmission. In a call with more users, a list identifying all users with video enabled would be delivered by the network to all other users in the call with video enabled. This also applies to audio enablement/disablement.

At step 608, the user operating the third UE, that is, MS 108, can elect to watch the second UE's video. Similarly, at step 610, the user operating the second UE, that is, MS 107, can elect to watch a media file sent from the third UE, that is, MS 108. Processing flow diagram 600 then ends. In other words, any participating user with video enabled can elect to receive video from any other user participating in the call that has video enabled. The user operating the first UE may opt-out of receiving video but may continue to receive audio. If the video media file, or stream, is set to "mandatory" status, then the first UE, that is, MS 106, may be excluded from the session. Thus, communication system 100 may provide true flexibility as to whose video each participant in a group call receives.

Because clients are able to select which streams of the session they wish to receive, in one embodiment of the present invention, the session originator is able to designate one or more media streams of multiple media streams as "mandatory" (all session participants are requested to receive the stream) or "optional" (potential receiving clients can elect to block the stream). In various embodiments of the present invention, with respect to mandatory media streams, an arbiter and/or a sending UE can send an instruction to participating users equipment, or to the PoC server, to remove from the entire communication session all of the communication devices that do not have media playback ability with respect to the mandatory media stream, to disallow the session altogether if any of the participating UE does not have media playback ability with respect to the mandatory media stream, or to disallow any UE that does not have media playback ability from receiving the mandatory media stream. With respect to optional media streams, UEs that have media playback ability for the optional media stream may choose whether to receive and/or display the media stream. For 1-to-1 sessions, the originator could also have the ability to specify if the video stream is full-duplex or simplex.

The above-described features of the present invention provide a powerful and general capability which enables many new PoC/PTT services for 1-to-1, group, and chat sessions. These services include:

Push-to-Show with arbitrated video, where one user may be talking while another user in the same session is sharing video. Only one video stream is active in this type of session. In this particular service, both the voice and video streams are mandatory and arbitrated by the PoC server.

Push-to-Show with non-arbitrated video, where one user talks at a time but all users can independently request video from other users in the same session. Video and audio streams can be synchronized. In this service, the voice stream is mandatory and arbitrated by the PoC server. The video stream is optional and not arbitrated by the PoC server.

Video Push-to-Talk with video that follows the talker. In this service, video is transmitted by a current talker to the other participating MSs. In this service, the voice stream is mandatory and arbitrated by the PoC server. The video stream is optional and arbitrated by the PoC server.

Push-to-Talk with non-arbitrated video, where users can independently select a video feed from another participant in the same SIP session. This service includes a mandatory voice stream that is arbitrated by the PoC server and an optional non-arbitrated video stream.

Push-to-Jam, where one user is transmitting a music stream, while another user is, for instance, talking or singing. This service includes a PoC server arbitrated voice stream and a client arbitrated music stream.

Push-to-Lecture, where, for instance, a professor giving a lecture, decides the floor should be granted to a student for a question. In this service, the voice stream is mandatory and PoC server arbitrated and the video stream is optional and user arbitrated.

Push-to-Track, where one user is transmitting real-time location information (e.g., first responder at incident location), and other users have arbitrated voice. In this service, the voice stream is mandatory and PoC server arbitrated and a positioning stream is also mandatory, but user arbitrated.

Video Customer Service, where a customer service organization determines whether the organization or the customer is sharing a video. In this service, the voice stream is mandatory and PoC server arbitrated and the video stream is optional and user arbitrated.

Figure 7:
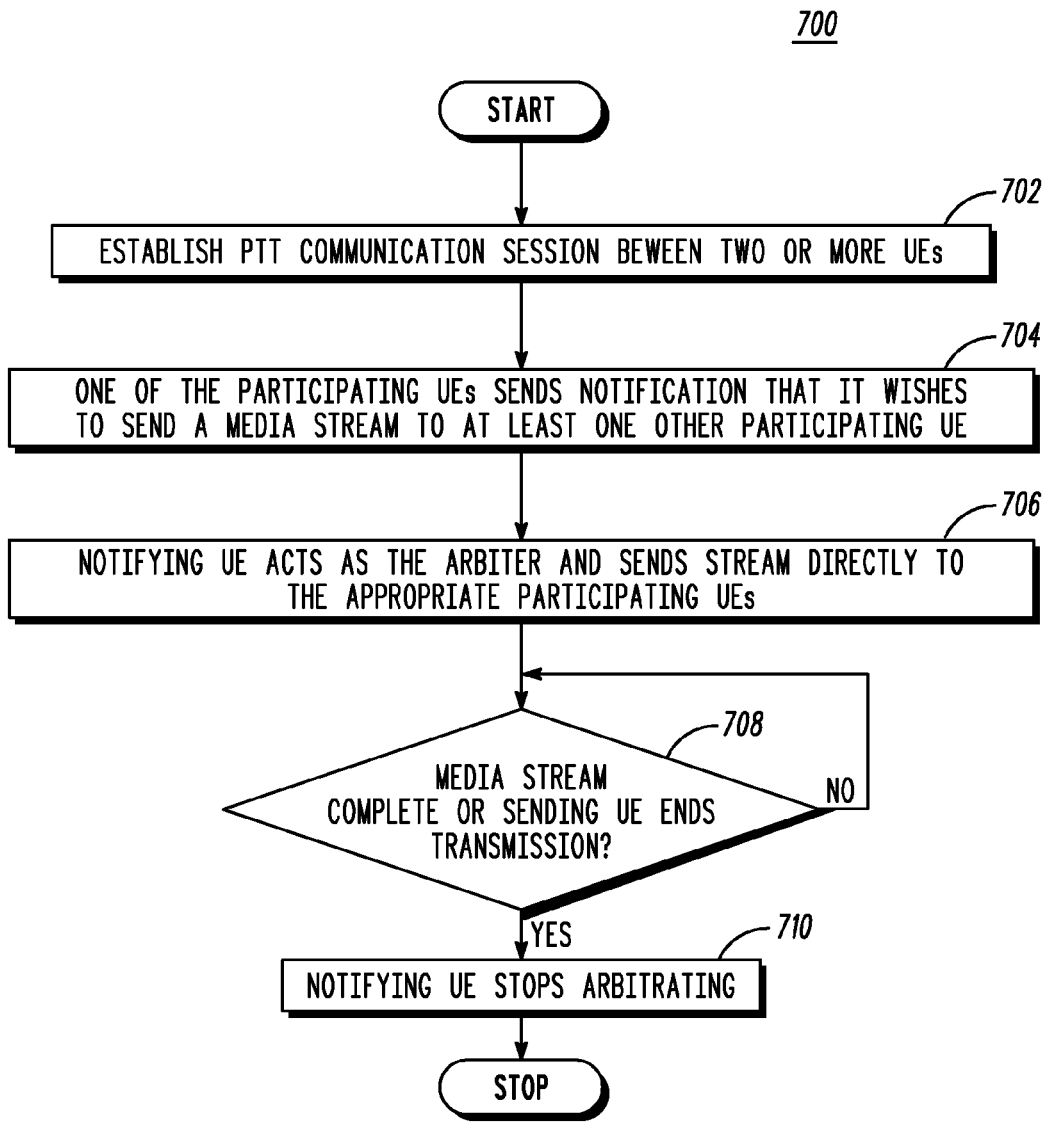
FIG. 7 is a Push-To-Talk (PTT) communications session detailed processing flow diagram according to another embodiment of the present invention.

FIG. 7 is a Push-To-Talk (PTT) communications session processing flow diagram 700 according to yet another embodiment of the present invention. Processing flow 700 is performed by exemplary embodiments of the present invention to establish and maintain a PoC communication session where arbitration can be shared. Processing flow 700 begins by establishing, at step 702, a Push-To-Talk (PTT) communication session between two or more UEs, for example, two or more of MSs 106-108 or other suitably equipped communications devices such as wired communication device 112. In this exemplary embodiment, the two or more UEs communicate through a SIP Push-To-Talk (PTT) server, such as PoC server 110, which retains arbitration over voice streams. At step 704, one of the participating UEs, for example, MS 106, notifies at least one other participating UE, for example, MS 107, that it wishes to send a media stream to the other UE. At step 706, the notifying UE, that is, MS 106, begins transmitting its media file in the form of a stream, but instead of sending it to the PoC server 110 and allowing the PoC server to arbitrate which devices receive the stream, the sending UE, that is, MS 106, acts as the arbiter and sends the stream to the appropriate participating UEs bypassing the PoC server 110 and without receiving a transmit instruction from the PoC server. At step 708, once the complete media stream is sent or the sending UE, that is, MS 106, ends transmission, as in the case of a video stream with no ending, for example, a surveillance camera, at step 710 the sending UE ceases arbitrating and the communication session continues with the PoC server 110 arbitrating voice transmission. The processing flow diagram 700 then ends.

The present invention may be realized in hardware, software, or a combination of hardware and software. A system according to an exemplary embodiment of the present invention may be realized in a centralized fashion in one computer system, or in a distributed fashion where different elements are spread across several interconnected computer systems. Any kind of computer system—or other apparatus adapted for carrying out the methods described herein—is suited. A typical combination of hardware and software might be a general purpose computer system with a computer program that, when being loaded and executed, controls the computer system in order to carry out the methods described herein.

The present invention may also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least one computer readable medium that allows the computer to read data, instructions, messages or message packets, and other computer readable information. The computer readable medium may include non-volatile memory, such as ROM, Flash memory, Disk drive memory, CD-ROM, SIM card, and other permanent storage. Additionally, a computer medium may include, for example, volatile storage such as RAM, buffers, cache memory, and network circuits.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Reference throughout the specification to "one embodiment" means that a particular feature, structure, or characteristic described in connection with the embodiment is included in at least one embodiment of the present invention. Thus, the appearances of the phrases "in one embodiment" in various places throughout the specification are not necessarily all referring to the same embodiment. Furthermore, the particular features, structures, or characteristics may be combined in any suitable manner in one or more embodiments. Moreover these embodiments are only examples of the many advantageous uses of the innovative teaching herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

While the various embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of managing a Push-To-Talk over Cellular communication session comprising a media stream, the method comprising:
   engaging, by a user equipment, in a Session Initiation Protocol Push-To-Talk communication session that includes a Session Initiation Protocol Push-To-Talk server and at least one other user equipment; and
   designating, by the user equipment, one of the Session Initiation Protocol Push-To-Talk server, the user equipment, and the at least one other user equipment to act as an arbiter of the media stream, wherein the arbiter grants a floor for transmitting the media stream.

2. The method of claim 1, wherein the user equipment is an originator of the Session Initiation Protocol Push-To-Talk communication session.

3. The method of claim 2, wherein designating comprises designating, by the user equipment and when establishing the communication session, one of the Session Initiation Protocol Push-To-Talk server to act as an arbiter of the media stream, the user equipment to act as an arbiter of the media stream, and the at least one other user equipment to act as an arbiter of the media stream.

4. The method of claim 1, further comprising, prior to designating, requesting, by the user equipment, to add the media stream to the Session Initiation Protocol Push-To-Talk communication session.

5. The method of claim 4, wherein the user equipment is not an originator of the Session Initiation Protocol Push-To-Talk communication session.

6. The method according to claim 4, wherein the user equipment designates one of the Session Initiation Protocol Push-To-Talk server to act as an arbiter of the media stream, the user equipment to act as an arbiter of the media stream, and the at least one other user equipment to act as an arbiter of the media stream.

7. The method of claim 1, further comprising receiving, by the user equipment, the media stream.

8. The method of claim 1, further comprising transmitting, by the user equipment and while engaged in the communication session, the media stream to the at least one other user equipment without receiving a transmit instruction from the Push-To-Talk server.

9. The method according to claim 1, further comprising receiving, by the user equipment and while engaged in the Session Initiation Protocol Push-To-Talk communication session, the media stream from the at least one other user equipment without a conveyance of a transmit instruction by the Push-To-Talk server to the at least one other user equipment.

10. The method according to claim 1, wherein designating comprises designating, by the user equipment, the user equipment to act as an arbiter of the media stream wherein the method further comprises:
   receiving, by the designated arbiter, a request to transmit; and in response to receiving the request to transmit, conveying, by the by the designated arbiter, a floor grant.

11. The method according to claim 1, further comprising:
conveying, by a participant in the Session Initiation Protocol Push-To-Talk communication session to the designated arbiter, a request to transmit;
in response to conveying the request to transmit, receiving, by the participant from the designated arbiter, a floor grant;
replicating, by the participant, the media stream to produce a plurality of replicated copies of the media stream; and
conveying, by the by the participant, the plurality of replicated copies of the media stream to other participants in the communication session.

12. The method according to claim 1, further comprising:
receiving, by the designated arbiter, the media stream;
replicating, by the designated arbiter, the media stream to produce a plurality of replicated copies of the media stream; and
conveying, by the by the designated arbiter, the plurality of replicated copies of the media stream to other participants in the communication session.

13. The method of claim 1, wherein the Session Initiation Protocol Push-To-Talk communication session comprises a plurality of media streams and wherein the user equipment designates an arbiter for each media stream of the plurality of media streams.

14. The method of claim 1, wherein the Session Initiation Protocol Push-To-Talk communication session comprises a plurality of media streams and wherein the user equipment designates a different arbiter for each media stream of the plurality of media streams.

15. The method of claim 1, wherein designating comprises designating, by the user equipment, the at least one other user equipment to act as an arbiter of the media stream and further comprising designating, by the at least one other user equipment, one or more of the Session Initiation Protocol Push-To-Talk server to act as an arbiter of the media stream, the user equipment to act as an arbiter of the media stream, and yet another user equipment to act as an arbiter of the media stream.

16. The method of claim 1, wherein the Session Initiation Protocol Push-To-Talk communication session comprises a plurality of media streams, wherein a first media stream of the plurality of media streams has a different originator than a second media stream of the plurality of media streams, and wherein an originator of the first media stream designates an arbiter of the first media stream and an originator of the second media stream designates an arbiter of the second stream.

17. The method according to claim 1, wherein the communication session comprises a plurality of media streams and wherein the method further comprises:
designating one or more media streams of the plurality of media streams as mandatory; and
performing one of:
sending an instruction to remove from the session all of the at least one second user equipment that does not have media playback ability with respect to the mandatory media stream;
disallowing the session if any of the at least one second user equipment does not have media playback ability with respect to the mandatory media stream; and
disallowing all of the at least one second user equipment that does not have media playback ability with respect to the mandatory media stream from receiving the mandatory media streams.

18. The method according to claim 1, further comprising designating the media stream as optional.

19. The method according to claim 18, further comprising, when the media stream is designated as optional, allowing user equipment that have media playback ability to choose whether to receive the media stream.

20. A user equipment comprising a processor that is adapted to:
designate, while engaged in a Session Initiation Protocol Push-To-Talk communication session that includes a media stream, a Session Initiation Protocol Push-To-Talk server, and at least one other user equipment, at least one of a Session Initiation Protocol Push-To-Talk server and one of the at least one other user equipment to act as an arbiter of a media stream, wherein the arbiter grants a floor for transmitting the media stream; and
transmit, while engaged in the communication session and without receiving a transmit instruction from the Push-To-Talk server, the media stream directly to at least one of the at least one other user equipment.

21. The user equipment according to claim 20, wherein the communication session comprises a plurality of media streams and wherein the first user equipment requests an arbiter for each media stream of the plurality of media streams.

22. The user equipment according to claim 20, wherein the communication session comprises a plurality of media streams and wherein the first user equipment requests a different arbiter for each media stream of the plurality of media streams.

23. The user equipment according to claim 20, wherein the communication session comprises a plurality of media streams, wherein a first media stream of the plurality of media streams has a different originator than a second media stream of the plurality of media streams, and wherein an originator of the first media stream designates an arbiter of the first media stream and an originator of the second media stream designates an arbiter of the second stream.

24. The user equipment according to claim 20, further comprising a transceiver for receiving a grant, from the arbiter of a floor with respect to a media stream, and wherein the transmitting is in response to the grant.

25. The user equipment according to claim 20, wherein the processor further is adapted to designate a media stream as mandatory.

26. The user equipment of claim 20, wherein the communication session comprises a plurality of media streams, wherein a media stream of the plurality of media streams is designated as mandatory, and wherein the processor is adapted to perform one of:
send an instruction to remove from the session all of the at least one other user equipment that does not have media playback ability with respect to the mandatory media stream;
disallow the session if any of the at least one other user equipment does not have media playback ability with respect to the mandatory media stream; and
disallow all of the at least one other user equipment that does not have media playback ability from receiving the mandatory media stream.

27. The user equipment according to claim 20, wherein the processor is adapted to designate the media stream as optional.

\* \* \* \* \*